United States Patent
Canedo et al.

(10) Patent No.: US 10,044,749 B2
(45) Date of Patent: Aug. 7, 2018

(54) SYSTEM AND METHOD FOR CYBER-PHYSICAL SECURITY

(71) Applicant: SIEMENS CORPORATION, Iselin, NJ (US)

(72) Inventors: Arquimedes Martinez Canedo, Plainsboro, NJ (US); Livio Dalloro, Princeton, NJ (US); Dong Wei, Edison, NJ (US); Benjamin Collar, Lawrence Township, NJ (US)

(73) Assignee: SIEMENS CORPORATION, Iselin, NJ (US)

( * ) Notice: Subject to any disclaimer, the term of this patent is extended or adjusted under 35 U.S.C. 154(b) by 185 days.

(21) Appl. No.: 15/223,199

(22) Filed: Jul. 29, 2016

(65) Prior Publication Data
US 2017/0034205 A1 Feb. 2, 2017

Related U.S. Application Data

(60) Provisional application No. 62/199,510, filed on Jul. 31, 2015.

(51) Int. Cl.
*H04L 29/06* (2006.01)

(52) U.S. Cl.
CPC ........ *H04L 63/1441* (2013.01); *H04L 63/145* (2013.01)

(58) Field of Classification Search
None
See application file for complete search history.

(56) References Cited

U.S. PATENT DOCUMENTS

| | | | | |
|---|---|---|---|---|
| 9,742,788 | B2* | 8/2017 | Hassanzadeh | H04L 63/1416 |
| 2012/0210158 | A1* | 8/2012 | Akiyama | G06F 21/554 |
| | | | | 714/2 |
| 2013/0031037 | A1* | 1/2013 | Brandt | H04L 63/1408 |
| | | | | 706/12 |
| 2015/0326460 | A1* | 11/2015 | Wang | H04L 43/026 |
| | | | | 370/252 |
| 2016/0149932 | A1* | 5/2016 | Blue | H04L 63/1408 |
| | | | | 726/22 |
| 2016/0306337 | A1* | 10/2016 | Gandelsman | G05B 19/058 |

* cited by examiner

*Primary Examiner* — Benjamin E Lanier

(57) ABSTRACT

A system and method is provided that facilitates cyber-physical security. The system may comprise a controller including at least one first processor; a monitor system including at least one second processor; and a plurality of sensors configured to capture a plurality of measurements associated with at least one hardware component. The sensors may include both: at least one controller sensor that communicates with the controller; and at least one side-channel sensor that communicates with the monitor system and not with the at least one controller. The first processor of the controller may be configured to cause the controller to control the hardware component based at least in part on measurements from the controller sensor. The second processor of the monitor system may be configured to: receive the measurements from the sensors; determine whether the measurements are indicative of a possible cyberattack on the at least one hardware component; and generate at least one notification indicating a possible cyberattack based on the determination that the measurements are indicative of a possible cyberattack.

20 Claims, 3 Drawing Sheets

SYSTEM AND METHOD FOR CYBER-PHYSICAL SECURITY

CROSS REFERENCE TO RELATED APPLICATIONS

This application claims benefit of U.S. Provisional Application No. 62/199,510 filed on Jul. 31, 2015, which application is hereby incorporated herein by reference.

TECHNICAL FIELD

The present disclosure is directed, in general, to cyber-physical security.

BACKGROUND

Security systems may monitor network activity or changes to software in order to detect the presence of viruses, worms, or other cyber-attacks. Such security systems may benefit from improvements.

SUMMARY

A cyber-physical system is a physical system (hardware component) controlled and monitored by a computer or controller. Variously disclosed embodiments include systems and methods that may be used to facilitate cyber-physical security. In one example, a system may comprise at least one controller including at least one first processor. The system may also comprise a monitor system including at least one second processor. Also, the system may comprise a plurality of sensors configured to capture a plurality of measurements associated with at least one hardware component. The sensors may include both: at least one controller sensor that communicates with the at least one controller; and at least one side-channel sensor that communicates with the monitor system and not with the at least one controller. The at least one first processor may be configured to cause the at least one controller to control the at least one hardware component based at least in part on measurements from the at least one controller sensor. The second processor of the monitor system may be configured to receive the measurements from the sensors. The second processor may also be configured to determine whether the measurements are indicative of a possible cyberattack on the at least one hardware component. In addition, the second processor may be configured to generate at least one notification indicating a possible cyberattack based on the determination that the measurements are indicative of a possible cyberattack.

In another example, a method for cyber-physical security may comprise through operation of at least one processor of a monitor system receiving a plurality of measurements from a plurality of sensors associated with at least one hardware component. These sensors include both: at least one controller sensor that communicates with at least one controller; and at least one side-channel sensor that communicates with the monitor system and not with the at least one controller. The at least one controller may include at least one processor that is configured to cause the at least one controller to control the at least one hardware component based at least in part on measurements from the at least one controller sensor. Also, through operation of the at least one processor of the monitor system, the method may comprise: determining whether the measurements are indicative of a possible cyber-attack on the at least one hardware component; and generating at least one notification indicating a possible cyberattack based on the determination that the measurements are indicative of a possible cyberattack.

A further example may include a non-transitory computer readable medium encoded with executable instructions (such as a software component on a storage device) that when executed, causes at least one processor to carry out this described method.

Another example may include an apparatus including at least one hardware, software, and/or firmware based processor, computer, component, controller, means, module, and/or unit configured for carrying out functionality corresponding to this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
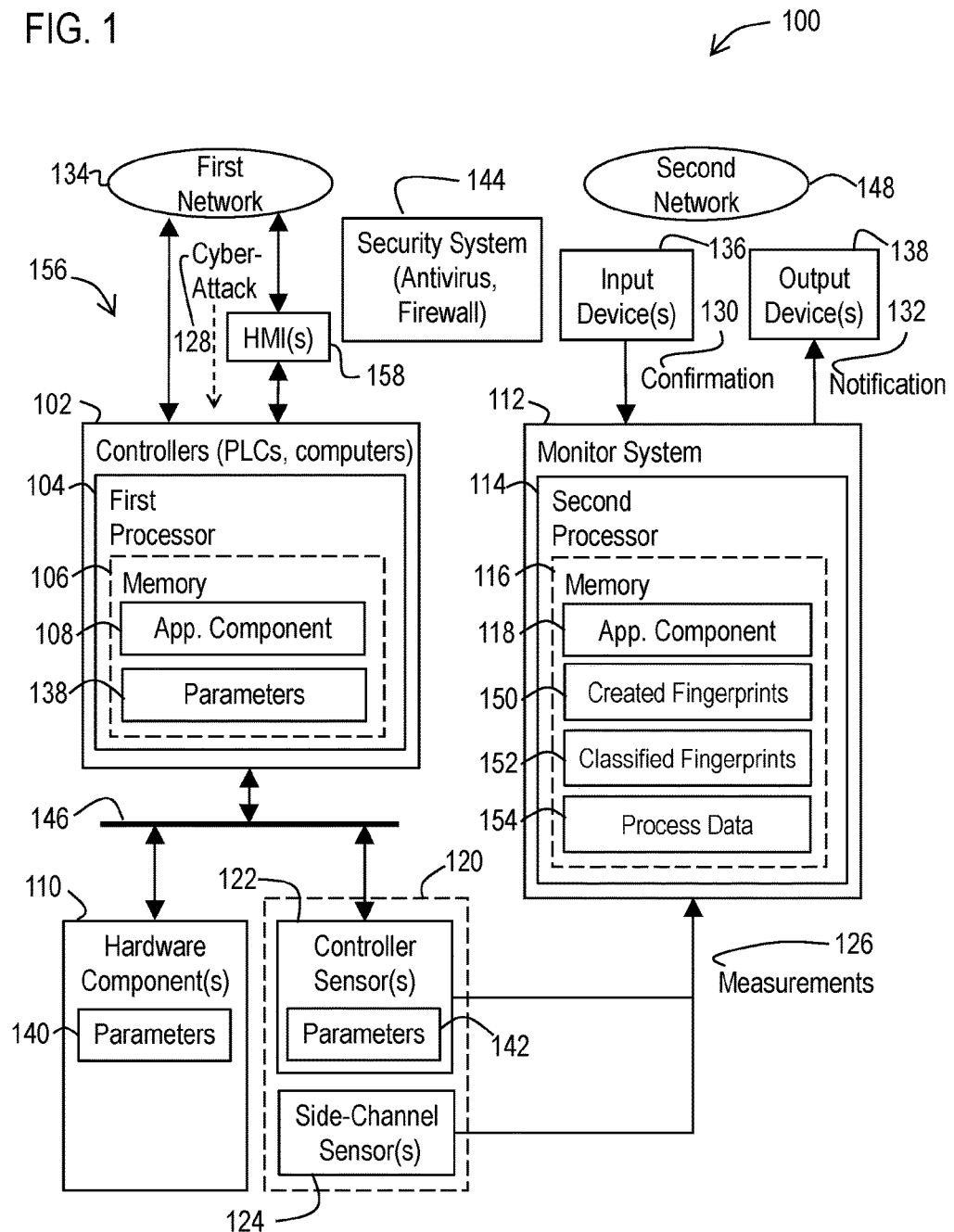
FIG. 1 illustrates a functional block diagram of an example system that facilitates cyber-physical security.

Various technologies that pertain to systems and methods that facilitate cyber-physical security will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

With reference to FIG. 1, an example system 100 is illustrated that facilitates cyber-physical security. The system 100 may include at least one controller 102 including at least one first processor 104 that is configured to execute instructions corresponding to at least one application component 108 (e.g., software/firmware) from a memory 106 accessed by the first processor. The application component may be configured (i.e., programmed) to cause the first processor to carry out various acts and functions described herein.

For example, the described controller 102 may correspond to a programmable logic controller (PLC), Supervisory control and data acquisition (SCADA) system, other type of industrial control system, and/or any other type of data processing system which is configured to control hardware components 110 (e.g., such as a furnace, electric transformer or packaging production line). Such a controller may be directly or indirectly connected to an IP based first network 134 or other type of network that may be the subject of a cyberattack.

As defined herein, a cyberattack corresponds to an attempt by hackers to gain access to a system in order to sabotage its operation and/or to steal information. With respect to the system illustrated in FIG. 1, the first network 134 could be accessible to a local hacker (having access to the system via a LAN) or a remote hacker (uncovering a security hole in order to gain access to the system via a WAN and/or the Internet). Thus, IT cybersecurity systems 144 including firewalls and antivirus software may be employed to detect and deter cyberattacks.

However, it should be appreciated that IT cybersecurity is in constant flux. For example, defense mechanisms are developed and deployed, and hackers find ways to bypass them and exploit computer systems and networks. Rather than relying exclusively on IT cybersecurity, example embodiments of the system 100 may use the physical state of hardware components 110 of one or more machines 156 controlled via one or more potentially vulnerable controllers 102 (e.g., PLCs) to identify potential cybersecurity breaches that were undetected by IT cybersecurity mechanisms.

Example embodiments may take advantage of features of cyberattacks that may change the physical behavior of the hardware component (e.g., the cyberattack on a German steel plant in 2014 and Slammer Worm infiltration of an Ohio nuclear plant). For example, the system 100 may be configured to: observe the physical effects of hardware components such as noise, vibration, thermal, and electromagnetic fields; detect anomalies; classify the anomalies as threats, and trigger an alarm notification to cyber security systems and/or the responsible human users, for further investigation.

In general, IT based cyber security systems may include software applications designed to prevent, detect, or counteract cyber-physical security threats (e.g., viruses, worms). Such solutions may monitor network activity or software in a server, workstation, human machine interface (HMI) 158 or other type of machine that manages the operation of PLCs and/or other types of controllers and/or hardware components in order to detect and attempt to remove and/or isolate such threats.

Unfortunately, cyberattacks may not always be carried out in a straightforward manner to directly target the end point with known virus or worm software, but rather may be decomposed into intermediate small (and frequently apparently innocuous) steps, which respectively allow the attacker to incrementally gain additional levels of access over time, until the hacker is ready to strike. To make it even more complex to detect, these step-wise attacks may not necessarily happen within a short time frame. Rather a cyberattack may take days, weeks or even months to be deployed, making it difficult to correlate events happening in the system to a cyberattack. This complexity makes the detection and avoidance of these sophisticated attacks and the identification of the underlying vulnerabilities exploited challenging to IT based cyber security systems.

Further, such cyberattacks may be increasingly directed to critical infrastructure (e.g., power distribution, transmission networks, manufacturing plants). In these cases, the attacks may be aimed at causing changes in the parameters 138, 140, 142 of the targeted controllers, hardware components, and/or sensors, rather than or in addition to changes to software/firmware code of the applications 108 that are executed by the controllers, components, and sensors, in order to modify physical hardware behavior and cause damage. It should be understood that IT based cyber security systems 144, such as anti-virus software and firewalls, may not be capable of detecting cyberattacks directed to physical machines such as the lower level controllers (e.g., PLCs and computers) that control and monitor physical machines and components thereof (e.g., via actuators and sensors).

The system 100 described herein is operative to overcome the deficiencies in IT based cybersecurity software and firewalls in order to detect cyberattacks directed to acts that damage physical machines. An example of such a cyberattack may correspond to an intrusion that changes one or more parameter 138 in a controller 102 such as a PLC that affects the angular speed of a drive for example. Such an attack may be possible due to a vulnerability in software in a manufacturing system (e.g., an HMI 158) that has gone undetected (e.g., a zero-day vulnerability) by traditional IT methods. The system described herein may be operable to identify such an attack by observing how the physics of the hardware components controlled by the modified software/firmware and/or parameters change after the attack is deployed.

As illustrated in FIG. 1, the system 100 may include a communication segregated monitor system 112 included in and/or connected to the machine 156 with the at least one described hardware component 110 and/or controller 102. Such, a monitor system may be "air gaped" or "air walled", by which bi-directional network communications from the network 134 and/or machine 156 to the monitor system are physically prevented (by an absence of a network connection), or electrically prevented (via an electrical or cryptographic process that permits only one-way communication from the monitor system).

The monitor system 112 may include at least one second processor 114 that is configured to execute instructions corresponding to at least one application component 118 (e.g., software/firmware) from a memory 116 accessed by the second processor. The application component may be configured (i.e., programmed) to cause the second processor to carry out various acts and functions described herein.

In example embodiments, the second processor may be configured to receive a plurality of measurements 126 from a plurality of sensors 120 configured to sense behaviors associated with the at least one hardware component 110 (such as the hardware component itself and/or processes associated with the hardware component). Such sensors may include both: at least one controller sensor 122 and at least one side-channel sensor 124. As defined herein, a controller sensor 122 corresponds to a sensor that is configured to detect and communicate measurements to the controller 102 and to the monitor system 112. Also, as defined herein, a side-channel sensor 124 corresponds to a sensor that is configured to detect and communicate measurements to the monitor system 112 but is not configured to communicate measurements to the controller 102. It should be understood that a controller sensor does not need to be mounted on the controller board, but may rather corresponds to a sensor that communicates with the controller.

For example, the controller may correspond to a PLC that communicates with the hardware components 110 and the controller sensors 122 via a fieldbus 146 (e.g., Profibus, Foundation Fieldbus) or other bidirectional wired or wireless communication system. However, the described side-channel sensor is not connected to the controller 102 via the fieldbus 146 and thus is not operable to carry out bidirectional communications with the controller 102. Rather the side-channel sensor 124 may only be configured to communicate sensor measurements to the monitor system 112 via an independent network, such as a separate fieldbus or other type of wired or wireless connection with the monitor system 112.

In example embodiments, the monitor system may be configured to determine whether the measurements are indicative of a possible cyberattack on the at least one hardware component. Also, the monitor system may be configured to generate and output at least one notification 132 indicating a possible cyberattack 128 based on the determination that the measurements are indicative of a possible cyberattack.

In some embodiments, the monitor system may include or be in communication with at least one output device 138 that serves as a visible or audible alarm output device configured to output the notification 132 in the form of a visible light and/or an audible sound that notifies users of a possible cyberattack. Such an output device, for example, may be integrated into the machine that includes the hardware components 110 and/or may be located remotely in a room and/or control panel where users can receive the notification of a cyberattack via a display screen and/or an audible alarm.

Also in some embodiments, the monitor system may be configured to communicate a notification 132 to a further system that is responsible for detecting and reporting cyberattacks, such as the previously described IT based security system 144 which provides notification via a display screen and/or an audible alarm. In addition, the monitor system and/or the IT based security system may be configured to cause an electronic message corresponding to the notification 132 to be communicated to an appropriate user. Such an electronic message may correspond to an SMS message, e-mail message, instant message, voice message, mobile device notification, and/or any other form of communication capable of notifying a user of a possible cyberattack.

In such an example, in order to maintain the "air gaped" or "air walled" configuration of the monitor system 112, the notification 132 may be communicated to the security system 144 via a unidirectional communication filter circuit that enables the notification to be communicated from the monitoring device, but that prevents the monitor system from receiving communications from the security system 144, which could include a worm, virus, or a hacker communication.

In an example embodiment, sensors 120 may be configured to sense physical information associated with the hardware components (i.e., measurements of the hardware components themselves and/or of the process or system that is controlled via the hardware components). For example, the sensors 120 may be configured to monitor the temperature of a heating element and/or monitor the temperature of a fluid that is being heated by the heating element.

The monitor system may carry out fingerprinting of the physical sensor data to identity anomalies in the behavior of the hardware components controlled via the controller 102 that may be associated with cyberattacks. The monitor system may create fingerprints 150 that correspond to time-based behavior signatures from the sensor measurements and compare such created fingerprints to predetermined and classified fingerprints 152 (e.g., classified as wear related, failure related, normal activity, possible cyberattack and/or other behavior classifications for the particular hardware components and/or process being measured).

Depending on the outcome of the comparison of fingerprints, the monitor system may determine activity that corresponds to a detection of a possible cyberattack or a mechanical issue (e.g., a bearing entering a failure mode or lubrication oil loss in a gearbox). The example monitor system may be operative to distinguish between cyberattacks and mechanical issues of a system and output different notifications indicative of each type of detection (e.g., cyberattack notification or mechanical issue notification). However, in other embodiments, the monitor system may only output notifications directed to cyberattacks. Further, in some embodiments, the type of notifications generated and outputted by the monitor system may be user configurable in the application software components of the monitor system.

In example embodiments, the notification to the IT cybersecurity software and/or experts or other security system, may include diagnostic information of the potential source of the attack, including the basis for indicating why the detected anomaly may be considered a cyberattack rather than a mechanical issue. For example, the notification may include subject matter such as: "a possible cybersecurity breach is detected in motor #4; physical behavior of the motor is not associated to wear and tear observed for the last two days with an average of 60 rpm"

In an example embodiment, the user receiving the notification may evaluate/research the anomaly identified in the notification by the monitor system in order to confirm that a possible cyberattack has occurred. For example, the user may review the parameters associated with the controller and/or the hardware component that set the angular velocity of motor #4. If such parameters have been changed, and the change was not carried out by an authorized user, a cyberattack may be considered to have occurred. Further, research may then be carried out to determine what other parameters and/or software may have been maliciously changed. Further, research may be carried out to determine the source of the cyberattack, the mechanism by which it was carried out. In addition, corrective actions may be taken to repair the software/parameters that may have been changed. Further, corrective actions may be taken to stop any ongoing malicious activity or access and additional security measures may be employed to prevent further cyberattacks.

Conversely, if the review reveals a mechanical issue that is responsible for the anomaly identified in the notification, a cyberattack may be considered unlikely. The effected hardware may then be scheduled for maintenance in order to correct and/or compensate for the detected mechanical issue.

An example embodiment of the described monitor system may be capable of receiving feedback regarding the manual confirmation of whether the notification correctly identified a cyberattack (and/or a mechanical issue). For example, the at least one second processor 114 of the monitor system may be configured to be responsive to at least one input from an input device 136 indicative of a positive or negative confirmation 130 that the at least one notification was or was not indicative of a cyberattack to generate or modify the classified fingerprints 152 that are used to identify cyberattacks and/or other behaviors.

In order to maintain the previously described "air gapped" or "air walled" configuration of the monitor system, the input device 136 may be directly connected to the monitor system (such as in the form of a touch screen, keyboard, pointer device). The monitor system may further be operative to provide a user interface such as a graphical user interface (GUI) through an output device 138 such as a display screen that is also directly connected to the monitor system. Such a GUI may provide a mechanism by which notifications 132 can be viewed and by which confirmations 130 can be provided.

However, it should be appreciated that the described input device 136 and output device 138 may not be directly connected to the monitor system. For example, the monitor system 112 may be connected to a second network 148 that is independent of the first network 134 via which the controllers 102 may be connected. Such a further network 148 may be segregated from the first network 134 in order to prevent a cyber-attack through the first network from gaining access to the monitor system 112.

As discussed previously, the sensors 120 connected to the monitor system include controller sensors 122 and side-channel sensors 124. Such controller sensors 122 may correspond to fieldbus sensors, for example, that are part of and necessary for the control of the hardware components and/or process being carried out by the hardware components. For example, a controller sensor may correspond to a fieldbus temperature sensor used by the controller 102 to maintain a chemical reaction at 70C.

In example embodiments, controller sensors in the form of fieldbus sensors may be used to gather measurements (such as for temperature, motion, pressure, flow rate, acceleration, vibration or other physical properties) in industrial automation for discrete manufacturing, process industries, and/or any other activity that uses controllers and sensors. Fieldbus data can be implemented, for example, at the PLC or SCADA level in order to provide the controller with measurements from the controller sensors 122. Also, time-stamps included in the fieldbus data may be useful to both the controller 102 as well as the monitor system 112. For example, the monitor system 112 may be configured perform time series analyses of the fieldbus data from the controller sensors 122 to create fingerprints 150. Since fieldbus data is directly related to the controller 102, the known semantics of the process domain facilitated by the controller 102 may be leveraged by the monitor system 112 to identify anomalies that may be associated with cyber-attacks. For example, if the measured temperature of a process is above an upper range that is physically possible by the process itself (as represented by predetermined classified fingerprints 152), the monitor system may be configured to detect a possible cyberattack on the temperature sensor and/or the controller.

The side-channel sensors may gather information generated as a byproduct of the hardware component's operation, such as sensors that detect an amount of electromagnetic radiation emitted by the controllers, power sources, and magnets of a drive. In example embodiments, side-channel sensors may be retrofitted into the hardware components, or correspond to environmental sensors whose purpose is to identify side-channel information. Other, examples of side-channel sensors may include a microphone array used in gas turbines that collect acoustic side channel data to predict failures, and/or thermal or electro-magnetic, vibration and video/thermal cameras.

In addition, side-channel sensors may measure behaviors for which controller sensors also measure. For both a controller sensor and a side-channel sensor may be used to measure the same property (e.g., the temperature of a reaction). In such examples, the monitoring software may be configured to determine that current measurements may indicate a possible cyberattack when measurements from at least one side-channel data sensor is not consistent with measurements from at least one controller sensor.

The side-channel measurements from the side-channel sensors 124 and the fieldbus measurements from the controller sensors 122 may be continuously collected and analyzed by the monitor system to create the time-based fingerprints 150 of the hardware and processes being observed. The created fingerprints may then be used to compare current observed behavior (in the created fingerprints) with the expected behavior (in predetermined classified fingerprints 152). For example, the monitor system may include a memory and/or a data store in which fingerprint data 150, 152 is stored therein for use with detecting possible cyberattacks.

The fingerprinting may be based on an observation that the behavior signature caused by wear & tear or mechanical malfunctions may be different from the behavior signature caused by a cyberattack, because it either shows a completely unknown behavioral pattern (i.e., new fingerprint) or it shows a well-known one (matching a predetermined classified wear fingerprint) but at a much more compressed time-scale (i.e., malicious attempts to mask attack as wear and tear can be identified by their accelerated lifecycle).

Further, a cyberattack may be identified with the monitor system by a set of fingerprints representative of a sequence of discrete (non-continuous) events that cause distinct behavior signatures. Conversely, mechanical issues may be identified with the monitor system by a set of predetermined classified fingerprints that are representative of preliminary continuous signs of degradation.

Example embodiments of the described monitor system may leverage machine learning techniques to analyze the fingerprints continuously over time, by means of a combination of supervised and unsupervised learning. Such learning carried out by the monitor system may identify and distinguish (among the many events happening continuously in the system) which events have the highest probability to be related to an ongoing cyberattack on the controllers, hardware components, and/or controller sensors.

Note that the expected behavior signatures (e.g., normal or expected fingerprints) may correspond to characteristic curves over time, which are obtained and classified as normal or expected by the monitor system by: (1) recording of the behavior of the machine during normal operation (in an uncontrolled environment); (2) simulating the machine behavior via synthetic data or recorded filed input data during the design phase of a machine; and/or (3) testing of a physical machine (in a controlled environment).

The classification of these behavior signatures (as normal or expected fingerprints) can be implemented using supervised learning algorithms of the monitor system with respect to sensed data of the physical domains involved; for example, temporal, frequency, thermal, electro-magnetic. Also, as discussed previously the learning process by the monitor system may include the integration of real-world feedback from the machine operators (via the previously confirmation inputs 130), or post mortem analyst (via use of a GUI generated by the monitor system) to classify new and/or pre-determined fingerprints or sets of fingerprints as possible cyberattacks or not cyberattacks (e.g., wear or malfunctions) from the expert assessment of a user. Over time, such classification of fingerprints (as cyberattacks or not cyberattacks) may become less and less necessary as the learning algorithms employed by the monitor system improve their performance.

It should also be understood that the monitor system may carry out machine learning based on fingerprints for similar machines, in cases where fingerprint data is not initially available (such as for legacy machines for which design and test information does not exist). For example, the monitor system may classify current behavior signatures using unsupervised learning algorithms by observing the features of the physical domains involved and the correlations to the fingerprints associated with the similar machines. In this example, fingerprints identified as possible cyberattacks or not cyberattacks (e.g., wear or malfunctions) may be made accessible to the monitor system (e.g., via a data store) for use with determining whether fingerprints generated for a similar machine may or may not correspond to a cyberattack.

It should also be understood that the described monitor system 112 may be configured to monitor more than one machine (and the hardware components associated with the machine) and may use fingerprints associated with similar machines to detect cyber-attacks. In addition, example embodiments of the described monitor system 112 may be operative to access process data 154 associated with the operations that are being carried out by the one or more machines 156 being monitored via the monitor system. The described monitor system may be configured to look for particular discrepancies between the accessed process data and the actual results of the process produced by the hardware components measured via the sensors 150.

For example, a machine 156 being monitored via the monitor system 112 may correspond to a three-dimensional (3D) printer. Such the 3D printer may include the at least one controller 102 and a plurality of hardware components 110 (e.g., deposition head, laser, build platform). The sensors 120 may include a side-channel sensor 124, for example, that independently counts the layers being deposited by the 3D printer to build up all or at least a portion of a part. The monitor system 112 in this example may be configured to access process data 154 from a memory/data store that specifies a first number of layers for all or at least a portion of the part that is being additively generated via the 3D printer. In this example, the at least one second processor 114 of the monitor system 112 may be configured to determine that the measurements from the sensors are indicative of a possible cyberattack when the measurement indicate a second number of layers for the portion of the part actually generated by the 3D printer (determined by the side-channel sensor 124) that are different than the first number layers (determined by the process data).

Figure 2:
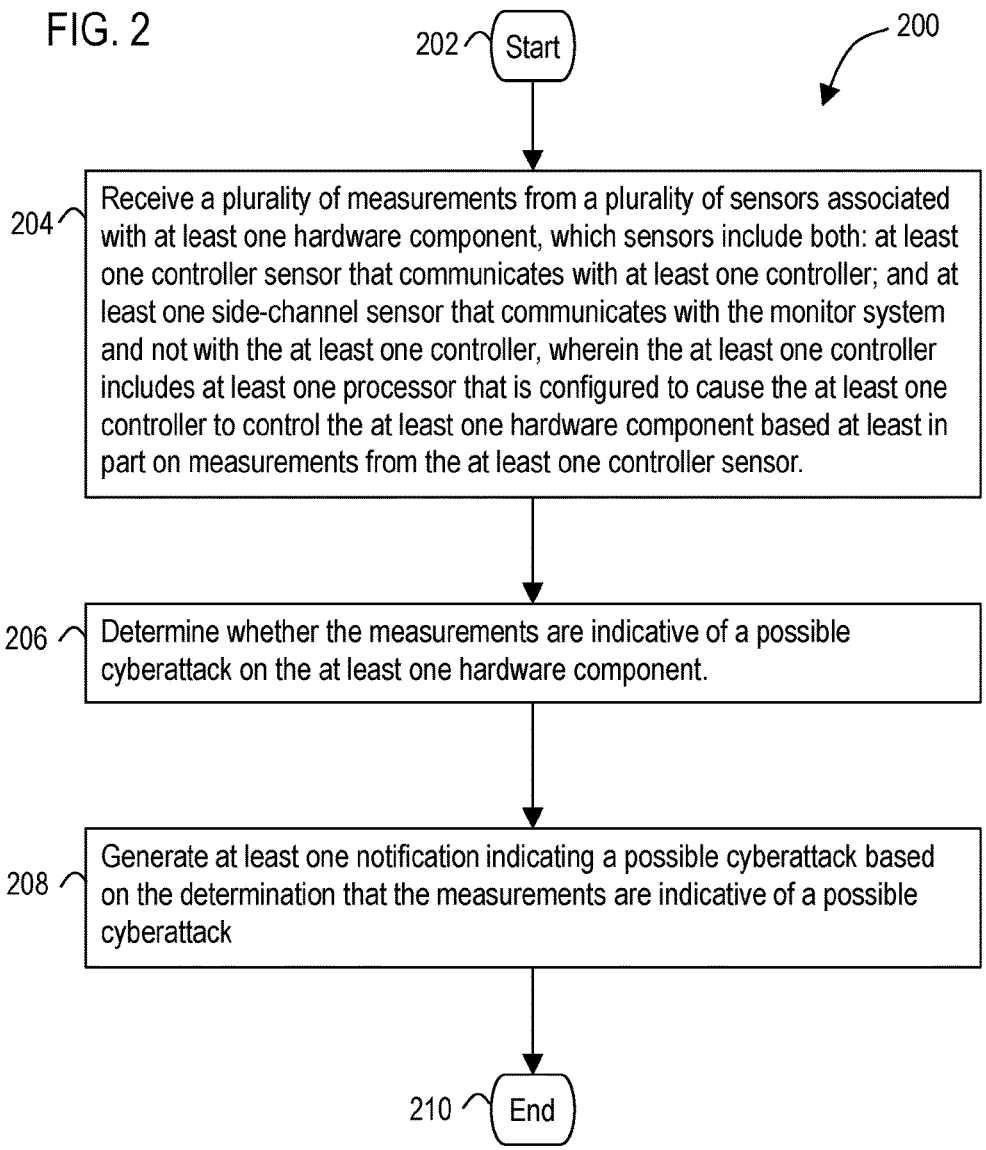
FIG. 2 illustrates a flow diagram of an example methodology that facilitates cyber-physical security.

With reference now to FIG. 2, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, floppy disks, hard disk drives, SSDs, flash memory, CDs, DVDs, and Blu-ray disks. The computer-executable instructions may include a routine, a sub-routine, programs, applications, modules, libraries, and/or the like. Still further, results of acts of the methodologies may be stored in a computer-readable medium, displayed on a display device, and/or the like.

Referring now to FIG. 2, a methodology 200 is illustrated that facilitates cyber-physical security. The methodology may start at 202 and may include several acts carried out through operation of at least one processor of a monitor system including an act 204 of receiving a plurality of measurements from a plurality of sensors associated with at least one hardware component, which sensors include both: at least one controller sensor that communicates with at least one controller; and at least one side-channel sensor that communicates with the monitor system and not with the at least one controller. In this example, the at least one controller may include at least one processor that is configured to cause the at least one controller to control the at least one hardware component based at least in part on measurements from the at least one controller sensor. In addition, the methodology may include through operation of the at least one processor of the monitor system: an act 206 of determining whether the measurements are indicative of a possible cyberattack on the at least one hardware component; and an act 208 of generating at least one notification indicating a possible cyberattack based on the determination that the measurements are indicative of a possible cyberattack. At 210 the methodology may end.

It should be appreciated that the methodology 200 may include other acts and features discussed previously with respect to the system 100. For example, the example controller may correspond to a programmable logic controller (PLC). Also, the at least one controller sensor may correspond to a fieldbus sensor. In addition, through operation of the at least one processor of the monitor system, the methodology 200 may include an act of determining that the measurements are indicative of a possible cyberattack when measurements from the at least one side-channel data sensor are not consistent with measurements from the at least one controller sensor.

Also, the methodology 200 may further comprise through operation of the at least one processor of the monitor system, an act of generating time-based fingerprints associated with the at least one hardware component based on measurements received from at least one of the sensors; and an act of comparing the generated fingerprints to predetermined fingerprints in order to determine whether the measurements are indicative of a possible cyberattack.

Further, the methodology 200 may comprise through operation of the at least one processor of the monitor system, an act of determining that the measurements are indicative of a possible cyberattack when the generated fingerprints do not match predetermined fingerprints.

The described methodology 200 may also comprise through operation of the at least one processor of the monitor system, an act of determining that the measurements are indicative of a possible cyberattack when the generated fingerprints match predetermined fingerprints classified as representative of normal wear, but carried out in a determined accelerated timeframe compared to the predetermined fingerprints.

In addition, the methodology 200 may comprise through operation of the at least one processor of the monitor system, an act of generating or modifying a classification for a predetermined fingerprint to reflect whether the predetermined fingerprint is or is not indicative of a possible cyber-attack, responsive to at least one input from an input device indicative of a positive or negative confirmation that the at least one notification was or was not indicative of a cyberattack.

Also, as discussed in a previous example, a machine corresponding to a 3D printer may include the at least one controller and the at least one hardware component. In this example, the methodology may include through operation of the monitor system: an act of accessing process data that specifies a first number of layers for at least a portion of a part that is to be additively generated via the 3D printer; and an act of determining that the measurements are indicative of a possible cyber-attack when the measurements indicate a second number of layers for the portion of the part actually generated by the 3D printer that is different than the first number of layers.

As discussed previously, acts associated with these methodologies (other than any described manual acts) may be carried out by one or more processors. Such processor(s) may be included in one or more data processing systems, for example, that execute software components (such as the described application software component) operative to cause these acts to be carried out by the one or more processors. In an example embodiment, such software components may comprise computer-executable instructions corresponding to a routine, a sub-routine, programs, applications, modules, libraries, a thread of execution, and/or the like. Further, it should be appreciated that software components may be written in and/or produced by software environments/languages/frameworks such as Java, JavaScript, Python, C, C#, C++ or any other software tool capable of producing components and graphical user interfaces configured to carry out the acts and features described herein.

Figure 3:
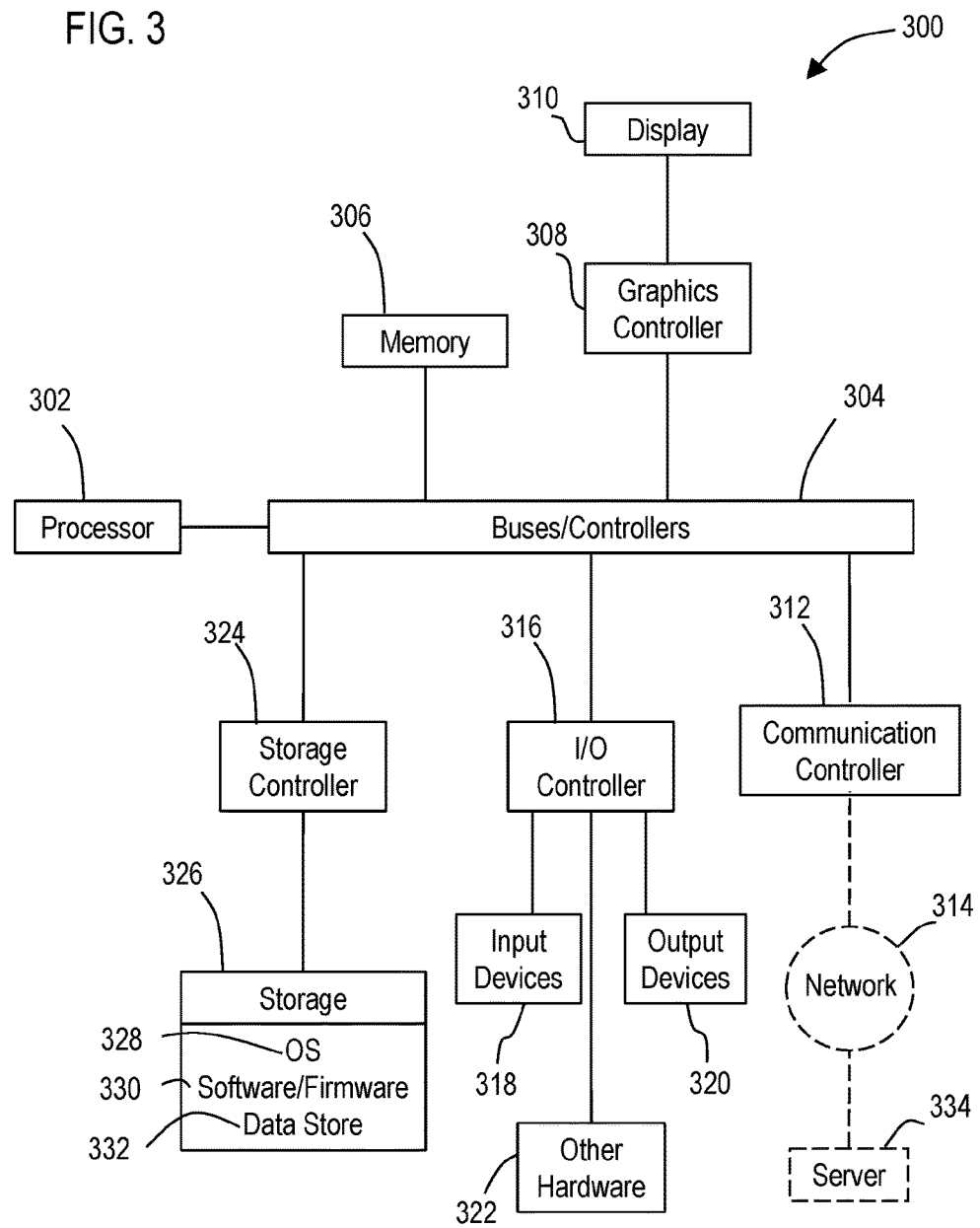
FIG. 3 illustrates a block diagram of a data processing system in which an embodiment may be implemented.

As described previously, the controller 102 may correspond to a PLC. However, in alternative embodiments the controller may correspond to other form factor for a microprocessor such as a general purpose data processing system. Further, the described monitor system may be implemented in many different microprocessor form factors including a general purpose data processing system. FIG. 3 illustrates a block diagram of a data processing system 300 (also referred to as a computer system) in which an embodiment can be implemented, for example, as a portion of the controller, HMI, security system, and/or any other system described herein. The data processing system depicted includes at least one processor 302 (e.g., a CPU) that may be connected to one or more bridges/controllers/buses 304 (e.g., a north bridge, a south bridge). One of the buses 304, for example, may include one or more I/O buses such as a PCI Express bus. Also connected to various buses in the depicted example may include a main memory 306 (RAM) and a graphics controller 308. The graphics controller 308 may be connected to one or more display devices 310. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 312 (Ethernet controllers, WiFi controllers, cellular controllers) operative to connect to a local area network (LAN), Wide Area Network (WAN), a cellular network, and/or other wired or wireless networks 314 or communication equipment.

Further components connected to various busses may include one or more I/O controllers 316 such as USB controllers, Bluetooth controllers, and/or dedicated audio controllers (connected to speakers and/or microphones). It should also be appreciated that various peripherals may be connected to the I/O controller(s) (via various ports and connections) including input devices 318 (e.g., keyboard, mouse, pointer, touch screen, touch pad, drawing tablet, trackball, buttons, keypad, game controller, gamepad, camera, microphone, scanners, motion sensing devices that capture motion gestures), output devices 320 (e.g., printers, speakers) or any other type of device that is operative to provide inputs to or receive outputs from the data processing system. Also, it should be appreciated that many devices referred to as input devices or output devices may both provide inputs and receive outputs of communications with the data processing system. For example, the processor 302 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 322 connected to the I/O controllers 316 may include any type of device, machine, or component that is configured to communicate with a data processing system.

Additional components connected to various busses may include one or more storage controllers 324 (e.g., SATA). A storage controller may be connected to a storage device 326 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 304 such as a PCI Express bus.

A data processing system in accordance with an embodiment of the present disclosure may include an operating system 328, software/firmware 330, and data stores 332 (that may be stored on a storage device 326 and/or the memory 306). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 312 may be connected to the network 314 (not a part of data processing system 300), which can be any public or private data processing system network or combination of networks, as known to those of skill in the art, including the Internet. Data processing system 300 can communicate over the network 314 with one or more other data processing systems such as a server 334 (also not part of the data processing system 300). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 302 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 300 in this example may correspond to a controller, computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In another example, such a client device may correspond to a computer running a web browser or thin client application. Inputs from the user may be transmitted from the web browser or thin client application to be evaluated on the server, rendered by the server, and an image (or series of images) sent back to the client computer to be displayed by the web browser or thin client application. Also in some examples, the remote processor described herein may correspond to a combination of a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 300 may conform to any of the various current implementations and practices known in the art.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is executing the software/firmware, which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may mean: that an element is relatively near to but not in contact with a further element; or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A system for cyber-physical security comprising:
   at least one controller including at least one first processor;
   a monitor system including at least one second processor;
   a plurality of sensors configured to capture a plurality of measurements associated with at least one hardware component, which sensors include both: at least one controller sensor that communicates with the at least one controller; and at least one side-channel sensor that communicates with the monitor system and not with the at least one controller;
   wherein the at least one first processor is configured to cause the at least one controller to control the at least one hardware component based at least in part on measurements from the at least one controller sensor;
   wherein the at least one second processor is configured to:
      receive the measurements from the sensors;
      determine whether the measurements are indicative of a possible cyberattack on the at least one hardware component; and
      generate at least one notification indicating a possible cyberattack based on the determination that the measurements are indicative of a possible cyberattack.

2. The system according to claim 1, wherein the at least one controller corresponds to a programmable logic controller (PLC), wherein the at least one controller sensor corresponds to a fieldbus sensor, wherein the at least one second processor is configured to:
   generate time-based fingerprints associated with the at least one hardware component based on measurements received from at least one of the sensors; and
   compare the generated fingerprints to predetermined fingerprints in order to determine whether the measurements are indicative of a possible cyberattack.

3. The system according to claim 2, wherein the at least one second processor is configured to determine that the measurements are indicative of a possible cyberattack when the generated fingerprints do not match predetermined fingerprints, wherein the fingerprints represent a pattern of measurements of side-channel sensors and controller sensors.

4. The system according to claim 2, wherein the at least one second processor is configured to determine that the measurements are indicative of a possible cyberattack when the generated fingerprints match predetermined fingerprints classified as representative of normal wear, but carried out in a determined accelerated timeframe compared to the predetermined fingerprints.

5. The system according to claim 4, wherein the at least one second processor is configured to be responsive to at least one input from an input device indicative of a positive or negative confirmation that the at least one notification was or was not indicative of a cyberattack to generate or modify a classification for a predetermined fingerprint to reflect whether the predetermined fingerprint is or is not indicative of a possible cyberattack.

6. The system according to claim 2, wherein the at least one second processor is configured to determine that the measurements are indicative of a possible cyberattack when measurements from the at least one side-channel data sensor are not consistent with measurements from the at least one controller sensor.

7. The system according to claim 2, wherein a machine corresponding to a three-dimensional (3D) printer includes the at least one controller and the at least one hardware component, wherein the monitor system is configured to access process data that specifies a first number of layers for at least a portion of a part that is to be additively generated via the 3D printer, wherein the at least one second processor is configured to determine that the measurements are indicative of a possible cyberattack when the measurements indicate a second number of layers for the portion of the part actually generated by the 3D printer that is different than the first number of layers.

8. A method for cyber-physical security comprising:
   through operation of at least one processor of a monitor system;
      receiving a plurality of measurements from a plurality of sensors associated with at least one hardware component, which sensors include both: at least one controller sensor that communicates with at least one controller; and at least one side-channel sensor that communicates with the monitor system and not with the at least one controller, wherein the at least one controller includes at least one processor that is configured to cause the at least one controller to control the at least one hardware component based at least in part on measurements from the at least one controller sensor;
      determining whether the measurements are indicative of a possible cyberattack on the at least one hardware component; and
      generating at least one notification indicating a possible cyberattack based on the determination that the measurements are indicative of a possible cyberattack.

9. The method according to claim 8, wherein the at least one controller corresponds to a programmable logic controller (PLC), wherein the at least one controller sensor corresponds to a fieldbus sensor, further comprising through operation of the at least one processor of the monitor system:
generating time-based fingerprints associated with the at least one hardware component based on measurements received from at least one of the sensors; and
comparing the generated fingerprints to predetermined fingerprints in order to determine whether the measurements are indicative of a possible cyberattack.

10. The method according to claim 9, further comprising through operation of the at least one processor of the monitor system:
determining that the measurements are indicative of a possible cyberattack when the generated fingerprints do not match predetermined fingerprints, wherein the fingerprints represent a pattern of measurements of side-channel sensors and controller sensors.

11. The method according to claim 9, further comprising through operation of the at least one processor of the monitor system:
determining that the measurements are indicative of a possible cyberattack when the generated fingerprints match predetermined fingerprints classified as representative of normal wear, but carried out in a determined accelerated timeframe compared to the predetermined fingerprints.

12. The method according to claim 11, further comprising through operation of the at least one processor of the monitor system:
responsive to at least one input from an input device indicative of a positive or negative confirmation that the at least one notification was or was not indicative of a cyberattack, generating or modifying a classification for a predetermined fingerprint to reflect whether the predetermined fingerprint is or is not indicative of a possible cyberattack.

13. The method according to claim 9, further comprising through operation of the at least one processor of the monitor system:
determining that the measurements are indicative of a possible cyberattack when measurements from the at least one side-channel data sensor are not consistent with measurements from the at least one controller sensor.

14. The method according to claim 9, wherein a machine corresponding to a three-dimensional (3D) printer includes the at least one controller and the at least one hardware component, further comprising through operation of the at least one processor of the monitor system:
accessing process data that specifies a first number of layers for at least a portion of a part that is to be additively generated via the 3D printer;
determining that the measurements are indicative of a possible cyberattack when the measurements indicate a second number of layers for the portion of the part actually generated by the 3D printer that is different than the first number of layers.

15. A non-transitory computer readable medium encoded with executable instructions that when executed, cause the at least one processor in a monitoring system to carry out a method comprising:
receiving a plurality of measurements from a plurality of sensors associated with at least one hardware component, which sensors include both: at least one controller sensor that communicates with at least one controller; and at least one side-channel sensor that communicates with the monitor system and not with the at least one controller, wherein the at least one controller includes at least one processor that is configured to cause the at least one controller to control the at least one hardware component based at least in part on measurements from the at least one controller sensor;
determining whether the measurements are indicative of a possible cyberattack on the at least one hardware component; and
generating at least one notification indicating a possible cyberattack based on the determination that the measurements are indicative of a possible cyberattack.

16. The computer readable medium according to claim 15, wherein the at least one controller corresponds to a programmable logic controller (PLC), wherein the at least one controller sensor corresponds to a fieldbus sensor, the method further comprising:
generating time-based fingerprints associated with the at least one hardware component based on measurements received from at least one of the sensors; and
comparing the generated fingerprints to predetermined fingerprints in order to determine whether the measurements are indicative of a possible cyberattack.

17. The computer readable medium according to claim 16, wherein the method further comprises:
determining that the measurements are indicative of a possible cyberattack when the generated fingerprints do not match predetermined fingerprints, wherein the fingerprints represent a pattern of measurements of side-channel sensors and controller sensors.

18. The computer readable medium according to claim 16, wherein the method further comprises:
determining that the measurements are indicative of a possible cyberattack when the generated fingerprints match predetermined fingerprints classified as representative of normal wear, but carried out in a determined accelerated timeframe compared to the predetermined fingerprints.

19. The computer readable medium according to claim 18, wherein the method further comprises:
responsive to at least one input from an input device indicative of a positive or negative confirmation that the at least one notification was or was not indicative of a cyberattack, generating or modifying a classification for a predetermined fingerprint to reflect whether the predetermined fingerprint is or is not indicative of a possible cyberattack.

20. The computer readable medium according to claim 16, wherein the method further comprises:
determining that the measurements are indicative of a possible cyberattack when measurements from the at least one side-channel data sensor are not consistent with measurements from the at least one controller sensor.

* * * * *